2 Sheets—Sheet 1.

E. S. BLAKE.

STOVE-PIPE DRUM.

No. 6,720. Reissued Nov. 2, 1875.

Witnesses:

Edwd Payson

Geo. H. Miatt

Inventor:

Edward S. Blake

Per Edw. E. Quimby

Atty.

N. PETERS, PHOTO-LITHOGRAPHER, WASHINGTON, D. C.

2 Sheets—Sheet 2.

E. S. BLAKE.

STOVE-PIPE DRUM.

No. 6,720. Reissued Nov. 2, 1875.

Witnesses:

Edw^d Payson

Geo. W. Miatt

Inventor:

Edward S. Blake

Per Edw. E. Quinby

Atty.

N. PETERS, PHOTO-LITHOGRAPHER, WASHINGTON, D. C.

UNITED STATES PATENT OFFICE.

EDWARD S. BLAKE, OF PITTSBURG, PENNSYLVANIA, ASSIGNOR, BY MESNE ASSIGNMENTS, TO ABNER A. GRIFFING.

IMPROVEMENT IN STOVE-PIPE DRUMS.

Specification forming part of Letters Patent No. 59,173, dated October 30, 1866; reissue No. 6,720, dated November 2, 1875; application filed October 12, 1875.

*To all whom it may concern:*

Be it known that I, EDWARD S. BLAKE, of Pittsburg, Pennsylvania, have invented a certain Improvement in Radiators, of which the following is a specification:

My invention relates to an improved form of radiators for heating purposes; and it consists of a radiator having the form of an elongated loop-pipe, joined at one end to a single tubular neck, by which the radiator is attached to the chamber, from whence it derives its supply of heat.

My loop-pipe is provided with a swinging valve at its lower extremity, for the purpose of deflecting heated air into either one or the other of the parallel legs of the loop-pipe. I provide an opening near the lower end of one of the legs of the loop for the escape of smoke when the radiator is used in connection with a stove.

Figure 1:
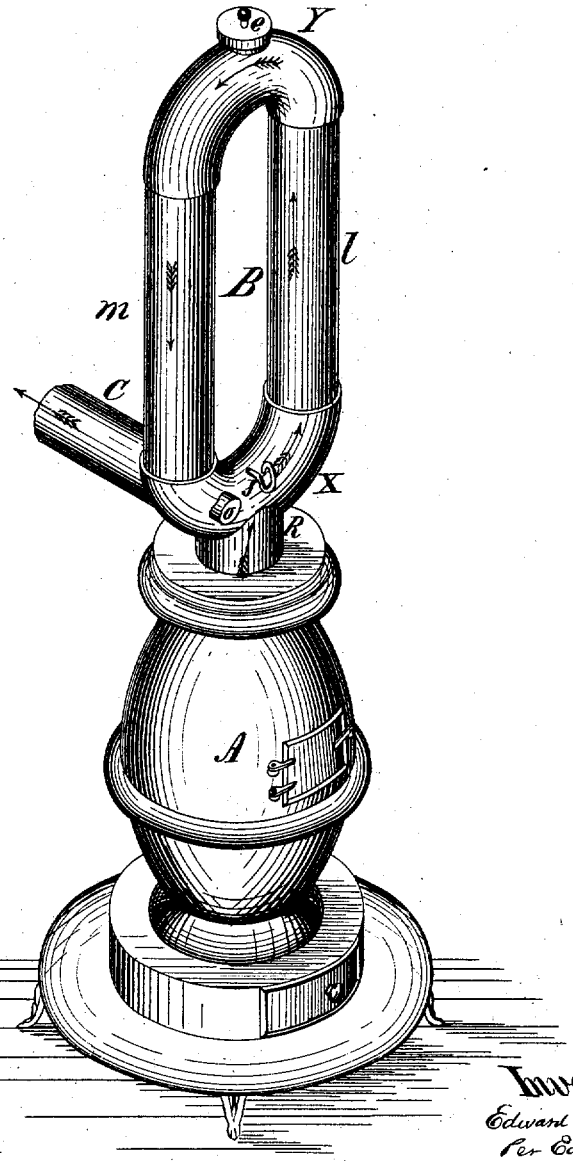
Figure 2:
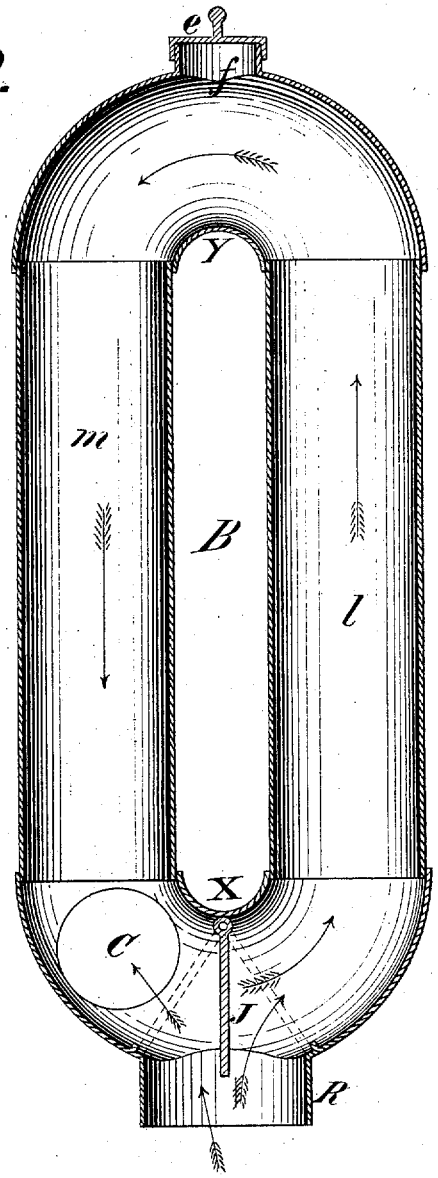

The accompanying drawings are as follows: Figure 1 is a perspective view of my improved radiator attached to an ordinary heating stove. Fig. 2 is a longitudinal vertical section of my improved radiator.

Referring to the drawings, A represents an ordinary heating-stove; B, my loop-pipe radiator, which consists of the two parallel pipes *l* and *m*, joined at the top by the return bend-pipe Y, and at the bottom by the return bend-pipe X, to the outer perimeter of which is affixed the tubular neck R, by means of which the radiator is attached to the top of the stove.

The lateral pipe C may be attached near the lower extremity of the radiator, for the purpose of carrying off products of combustion received into the radiator from the fire-chamber of the stove through the tubular neck R.

A gate-valve, J, is pivoted in the center of the return bend-pipe X, as shown, so as to swing either way, and deflect the products of combustion, or any part thereof, into either of the legs of the loop-pipes *l* and *m*, as may be desired. *f* represents an opening, which is placed in the upper part of the return bend-pipe Y. This opening is provided with a cap, *e*, and is used for the purpose of facilitating the cleaning and sweeping down of the soot, dust, &c., which may collect in the radiator. A capped opening, *o*, is placed in the return bend-pipe X, directly opposite the center of the exit-flue C, for facilitating the cleaning out of that flue.

It will be seen that the valve J deflects the smoke or heated currents either way, according to the direction in which it is swung, and the position which it is made to occupy.

The advantages of my improvement consist, first, in the enlargement of the radiating-surface, which is effected by bringing the entire shell of the loop-pipe radiator in contact with the heated currents; secondly, in controlling the course of the heated currents by means of the valve J, by the operation of which the heated currents may be made to circulate entirely around through the loop-pipe, or may be allowed to pass off directly into the exit-pipe C; thirdly, that in my radiator the heavier products of combustion introduced into radiator tend, by their own gravity, to fall back into and through the tubular neck R; fourthly, in a convenient arrangement of the openings for cleaning the inside of the shell of the loop-pipe and the exit-flue.

I claim as my invention—

1. The radiator made in the form of an elongated ring or loop, leading from the single tubular neck, by which the radiator is attached, the tubular neck being a longitudinal prolongation of the loop.

2. The loop-pipe radiator B, provided with the lateral pipe C and openings *o* and *f*, substantially as and for the purposes described.

3. The gate-valve J, in combination with the legs *l* and *m* of a loop-pipe radiator, substantially as and for the purposes described.

EDWARD S. BLAKE.

Witnesses:

A. K. HANNEN,

H. H. BLAKE.